US011231110B2

(12) United States Patent
Specht et al.

(10) Patent No.: US 11,231,110 B2
(45) Date of Patent: Jan. 25, 2022

(54) SHAFT SEAL HAVING A SHAFT SEALING RING

(71) Applicant: BRUSS SEALING SYSTEMS GMBH, Hoisdorf (DE)

(72) Inventors: Jan Specht, Hamburg (DE); Sebastian Teuscher, Hamburg (DE); Timo Besoke, Labenz (DE); Matthias Spitz, Hamburg (DE); Juergen Grundt, Neumuenster (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 32 days.

(21) Appl. No.: 16/562,797

(22) Filed: Sep. 6, 2019

(65) Prior Publication Data
US 2020/0080647 A1    Mar. 12, 2020

(30) Foreign Application Priority Data

Sep. 10, 2018  (DE) ...................... 10 2018 122 000.6

(51) Int. Cl.
| *F16J 15/447* | (2006.01) |
| *F16J 15/54* | (2006.01) |
| *F16J 15/3268* | (2016.01) |
| *F16J 15/34* | (2006.01) |

(52) U.S. Cl.
CPC ......... *F16J 15/447* (2013.01); *F16J 15/3268* (2013.01); *F16J 15/3404* (2013.01); *F16J 15/54* (2013.01)

(58) Field of Classification Search
CPC .... F16J 15/447; F16J 15/3268; F16J 15/3404; F16J 15/54; F16J 15/3204; F16J 15/3216; F16J 15/3248; F16J 15/3252; F16J 15/3256
See application file for complete search history.

(56) References Cited

U.S. PATENT DOCUMENTS

| 5,028,054 A | * | 7/1991 | Peach | ..................... | B65G 39/09 |
| | | | | | 277/348 |
| 2011/0221140 A1 | * | 9/2011 | Nakagawa | ........... | F16J 15/3264 |
| | | | | | 277/412 |
| 2015/0285379 A1 | * | 10/2015 | Matsui | .................... | F16J 15/002 |
| | | | | | 277/351 |
| 2016/0169393 A1 | | 6/2016 | Schmitt | | |

FOREIGN PATENT DOCUMENTS

| DE | 100 04 265 A1 | 8/2001 |
| DE | 103 34 896 A1 | 3/2005 |
| DE | 10 2011 114 349 A1 | 4/2012 |
| EP | 1 122 472 B1 | 4/2006 |
| EP | 2 749 796 A1 | 7/2014 |
| EP | 3 032 148 A1 | 6/2016 |

OTHER PUBLICATIONS

1st Examination Report issued by the German Patent and Trademark Office dated Feb. 25, 2019 with respect to priority German Patent Application No. 10 2018 122 000.6.

* cited by examiner

*Primary Examiner* — Gilbert Y Lee (74) *Attorney, Agent, or Firm* — Saliwanchik, Lloyd & Eisenschenk (57) ABSTRACT

Shaft seal for sealing a shaft against a housing of a motor vehicle, comprising a shaft sealing ring having a sealing lip for sealing the shaft against the housing, characterised in that a labyrinth seal is arranged upstream of the shaft sealing ring on the oil side thereof.

9 Claims, 5 Drawing Sheets

SHAFT SEAL HAVING A SHAFT SEALING RING

CROSS-REFERENCE TO A RELATED APPLICATION

This application claims priority under 35 U.S.C. § 119(e) of German Patent Application No. DE 10 2018 122 000.6, filed on Sep. 10, 2018, which is incorporated herein by reference in its entirety.

FIELD OF THE INVENTION

The present invention relates to a shaft seal having a shaft sealing ring having a sealing lip for sealing the shaft against the housing.

BACKGROUND OF THE INVENTION

In view of stricter emission regulations, there is ongoing demand for lower-friction shaft sealing rings for sealing crankshafts. At the same time, it is necessary to ensure that the shaft sealing ring is sufficiently stable with respect to negative and positive pressure occurring in the motor during operation; for example, in modern petrol engines, significant negative pressure may arise in the crankcase. In the past, friction-optimised radial shaft sealing rings were used to seal the crankshaft, pressure stabilisation being achieved by suitable geometry of the sealing lip. However, the reduction in friction that can be achieved with radial shaft sealing rings is limited.

An end-face mechanical seal for sealing the crankshaft is known from DE 10 2011 114 349 A1. End-face mechanical seals are generally very low-friction, but consist of a relatively large number of individual parts, take up a great deal of installation space and are relatively expensive.

An axial shaft sealing ring is known from FIG. 5 of DE 103 34 896 A1. In this shaft sealing ring, reliable sealing is achieved by three contacting sealing elements, namely a contacting dust seal, a contacting auxiliary seal and a sealing collar, albeit at the expense of increased friction.

The axial shaft sealing ring according to EP 2 749 796 A1 also comprises a dust lip that sealingly rests on the bearing ring over an axial length; said dust lip provides sufficient dust proofing, but again leads to increased friction. In addition, the sealing element has only low stability with respect to negative pressure; this is because the sealing lip flaps away from the bearing ring when there is negative pressure on the motor side, on account of a weakness close to the connection of said sealing lip to the reinforcement portion, and the sealing functionality of said sealing lip is then lost entirely.

EP 3 032 148 B1 discloses an axial shaft sealing ring having a sealing lip which sealingly interacts with a radial mating element; channels are provided either on the sealing lip or on the mating element, pressure building up in said channels when the shaft is rotating. As a result of this pressure build-up, the contact force of the lip on the mating element is lowered when the shaft is rotating, until gas friction sets in instead of fluid friction, resulting in a significant jump in the reduction of friction.

BRIEF SUMMARY OF THE INVENTION

The object of the invention is to provide a developed shaft seal having a shaft sealing ring, said shaft seal allowing the lowest possible friction, sufficient pressure stability and reliable sealing of the crankshaft in all operating conditions.

The invention achieves said object by means of the features of the independent claims. Further preferred developments can be found in the dependent claims, the drawings and the associated description.

According to the main concept of the invention, it is proposed to provide the shaft seal with a labyrinth seal arranged upstream of the shaft sealing ring on the oil side thereof.

On account of the proposed solution, the shaft seal is overall improved in that the oil from the oil side is kept away from the shaft sealing ring by the labyrinth seal. The shaft sealing ring is thereby exposed to a significantly smaller amount of oil or oil mist, such that the shaft sealing ring operates with a smaller amount of oil mist and thus in a manner closer to the preferred dry friction state. In addition, it is thereby possible to reduce the compressive forces on the components of the shaft seal, which in turn is advantageous in terms of the resultant frictional forces. Thus, it is possible to reduce the compressive forces in the shaft seal required to achieve specified degrees of sealing action, in particular in comparison with radial shaft seals. Since the labyrinth seal is essentially contact-free, friction is not increased by the labyrinth seal; only the sealing action of the entire shaft seal is increased and the shaft sealing ring is better protected.

Thus, it is possible to achieve a labyrinth seal that is particularly effective in terms of the degree of sealing action, by said labyrinth seal comprising two axially interlocking support bodies. On account of the two support bodies, it is possible to achieve highly complex labyrinth geometries which, from a manufacturing perspective, could not be achieved with just one component. Furthermore, the labyrinth seal can be particularly easily assembled by combining the two support bodies. In addition, by using support bodies having appropriate dimensional stability, it is possible to ensure that the labyrinth geometry between the support bodies is maintained, even when exposed to the acting operating forces.

Thus, it is possible to achieve particularly complex labyrinth geometries by one or both support bodies being angled in portions. On account of the angled shape, it is possible to achieve a labyrinth seal having labyrinth channels oriented at angles to one another such that the oil mist is diverted by one or more diversions and is thereby additionally slowed down in the labyrinth seal.

One of the support bodies is preferably intended to be fixed with respect to the shaft, and one of the support bodies is intended to be fixed with respect to a housing; thus, the two support bodies rotate to one another when the shaft is rotating. As a result of the proposed development, at least two of the opposite walls of a labyrinth channel rotate relative to one another, thereby purposely swirling the oil mist located therein and making it possible to further increase the throughflow resistance and the resultant sealing action of the labyrinth seal.

It is further proposed that the labyrinth seal comprise a radially extending reinforcement body on the oil side thereof. The reinforcement body allows the labyrinth seal to be reinforced or dimensionally stabilised in the specified shape thereof having the labyrinth channels, the labyrinth channels being supported by the arrangement of the reinforcement body on the oil side, in particular on the inlet side. Furthermore, by means of an appropriate shape and arrangement of the reinforcement body, a significant proportion of the oil or oil mist can be kept away from the labyrinth seal itself and thus also away from the shaft sealing ring; thus, the reinforcement body makes a further contribution to the sealing action of the shaft seal.

Furthermore, the labyrinth seal may preferably comprise a contact seal having a sealing lip and a mating surface that sealingly interacts with the sealing lip, such that the flow of the oil through the labyrinth seal can be further reduced in portions or even completely prevented.

It is further proposed that the contact seal be intended to be fixed with respect to the shaft, and the mating surface be fixed with respect to the housing. The mating surface is thus considered to be static, i.e. stationary, while the contact seal is moved relative thereto.

It is further proposed that the contact seal be designed and arranged to lift away from the mating surface when the shaft is rotating during proper operation. Accordingly, the contact seal rests against the mating surface when the shaft is not rotating, thereby completely sealing the flow of the oil, and thus the oil side from the atmosphere side. This is advantageous e.g. for a pressure test in which the shaft is not rotating, as carried out in e.g. transmissions or internal combustion engines of motor vehicles. Furthermore, the contact seal intentionally lifts away when the shaft is rotating during proper operation and thus performs a movement which can be used e.g. to convey the oil mist back towards the oil side, thereby making it possible to further improve the sealing action. Furthermore, the frictional forces acting in the shaft seal during operation and the wear of the shaft seal can be further reduced as a result of the removal of contact.

It is further proposed that the contact seal have a weak point which facilitates the lifting away of the contact seal due to the dimensioning and arrangement thereof. The contact seal can be produced from a single, uniform material, and the movement of the contact seal is purposely automatically forced by the forces that arise and act on the contact seal when the shaft is rotating. The part of the contact seal intended to be movable and the moment at which the movement is to performed are controlled by the arrangement of the weak point and the dimensioning of the wall thickness of the weak point or the dimensioning of deliberate recesses in the weak point.

The contact seal may preferably be formed of an elastomer material, which is advantageous due to the elastic properties thereof both in terms of the sealing action to be achieved and in terms of the mobility of the contact seal.

It is further proposed that the shaft sealing ring consist of a PTFE-containing material, at least in the region of the sealing lip of said shaft sealing ring. PTFE-containing materials have particularly good dry friction properties, which can be exploited particularly effectively by the solution according to the invention, namely the upstream arrangement of the labyrinth seal and the resultant advantage of keeping the oil mist away. The annular shaft seal having the PTFE components and being particularly favourable for dry friction is practically protected from the ingress of oil particles by the labyrinth seal, and thus operates dry; thus, such an annular shaft seal is particularly advantageous in combination with the labyrinth seal.

BRIEF DESCRIPTION OF THE FIGURES

The invention will now be explained on the basis of preferred embodiments with reference to the accompanying drawings, in which.

DETAILED DESCRIPTION

The shaft seal 10 is used to seal a shaft 11, in particular a crankshaft, which extends from a sealed oil chamber 27 towards the atmosphere-side exterior 25, through an opening 12 in a housing 13 of an internal combustion engine, electric drive motor or transmission of a motor vehicle. The housing 13 is, for example, formed in several parts and having an oil-side clamping element 30 and an atmosphere-side clamping element 31. The shaft seal 10 is supported radially externally in the opening 12 of the housing 13 and radially internally on the shaft 11, thereby sealing the annular space between the housing 13 and the shaft 11.

The shaft seal 10 comprises an annular, first reinforcement body 14 which is fixed with respect to the housing, an annular oil-side, second reinforcement body 23 which is fixed with respect to the housing, and an annular supporting body 26 which is fixed with respect to the shaft and to which a centrifugal seal 29 is fastened, for example by vulcanisation. Furthermore, the shaft seal 10 comprises a shaft sealing ring 16 in the form of a PTFE disc that is clamped between the first reinforcement body 14 and a clamping ring 15, which is supported on the atmosphere-side clamping element 31, so as to be fixed with respect to the housing. The first reinforcement body 14, the second reinforcement body 23 and the clamping ring 15 are clamped between a shoulder of the oil-side clamping element 30 and a shoulder of the atmosphere-side clamping element 31, and are thus considered to be stationary in relation to the housing 13.

The shaft sealing ring 16 has an opening through which the shaft 11 extends. Furthermore, the shaft sealing ring 16 is made of a PTFE-containing elastomer and thus has favourable dry friction properties, as are typical of said material. Together with the supporting body 26 and a contact seal in the form of a centrifugal seal 29, the first reinforcement body 14 and the second stiffening body 23 form a labyrinth seal arranged upstream of the shaft sealing ring 16 in relation to the oil chamber 27. Thus, to escape the oil chamber 27 towards the atmosphere-side exterior 25, the oil must first pass the labyrinth seal before reaching the shaft sealing ring 16. The shaft sealing ring 16 is thus protected by the labyrinth seal from the escaping oil; in other words, the amount of oil reaching the shaft sealing ring 16 from the oil chamber 27 can be significantly reduced by the labyrinth seal as a result of the increased throughflow resistance in said labyrinth seal.

On the shaft side, together with a spacer disc 18, a reinforcement plate 20 and a spacer ring 21, the supporting body 26 is held between a shoulder of the shaft 11 and a clamping disc 19 fixed on the shaft 11 on the end face thereof, and thereby rotates together with the shaft 11.

The supporting body 26 comprises an annular-disc-shaped, radially extending main body, a radially external annular flange protruding axially from the main body, and a radially internal annular flange protruding axially from the main body; together, the main body and the flanges form a U-shaped ring in cross section. The radially internal annular flange of the supporting body 26 is secured on the shaft 11 and is used to fix the supporting body 26.

The first reinforcement body 14 fixed with respect to the housing also comprises an annular-disc-shaped, radially extending main body, a radially external annular flange protruding axially from the main body, and a radially internal annular flange protruding axially from the main body; together, the main body and the flanges form a U-shaped ring in cross section. The radially external annular flange is used to fasten the first reinforcement body 14 in the housing 13 or on the inside of the oil-side clamping element 30.

The supporting body 26 and the first reinforcement element 14, as a result of the annular flanges provided thereon, both have an angular shape, and are arranged so as to interlock by means of the annular flanges and to form a throughflow channel having multiple diversions and increased resistance to the throughflow of the oil mist. Furthermore, the supporting body 26 rotates together with the shaft 11 when said shaft rotates, such that the walls of the supporting body 26 also rotate relative to the walls of the reinforcement element 14 fixed to the housing, and additionally swirl the oil mist present in the throughflow channel of the labyrinth, thereby further increasing throughflow resistance.

Figure 1:
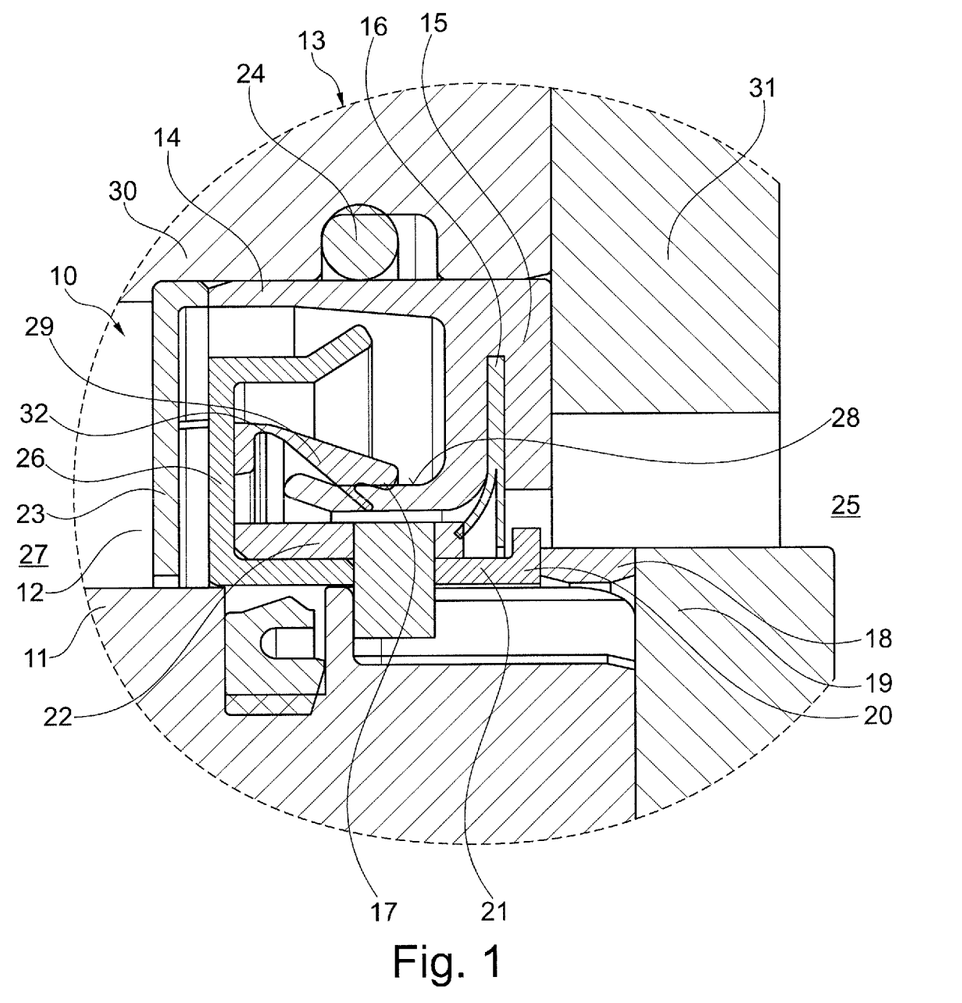
FIG. 1 is a cross section through a shaft seal according to the invention, according to a first embodiment.

The centrifugal seal 29 is provided on the supporting body 26 in the form of an elastomer, which is vulcanised onto the side of the main body of the supporting body 26 from which the annular flanges protrude, specifically between the annular flanges, i.e. into the U shape of the supporting body 26. The centrifugal seal 29 has a weak point 32 having a reduced thickness at the connection to the supporting body 26, and is shaped so as to be oriented, when unloaded, axially and radially inwards towards the radially internal annular flange of the supporting body 26. As a result, in the assembled state, a sealing lip of the centrifugal seal 29 of the supporting body 26 comes to sealingly rest against a radially external mating surface 28 of the radially internal annular flange of the first reinforcement body 14, as can be seen in FIG. 1. Provided that the sealing lip is formed circumferentially, the throughflow channel in the labyrinth seal and thus the connection between the oil chamber 27 and the atmosphere-side exterior 25 is thereby completely closed when the shaft 11 is stationary. If the shaft 11 is rotating at its operating speed, the supporting body 26 also rotates at this operating speed, together with the centrifugal seal 29 arranged thereon. The thickness of the weak point 32 is such that under the influence of the radial forces brought about by rotation of the shaft 11, the part of the centrifugal seal 29 on which the sealing lip is arranged lifts away from the mating surface 28 at the sealing lip; as a result, friction is reduced and the flow channel in the labyrinth seal is cleared, at least to the extent of a small gap between the sealing lip and the mating surface 28. The drawback of it being possible for the oil mist to flow through the labyrinth in the position in which the centrifugal seal 29 has lifted away is tolerated in return for the intentionally achieved advantage of reduced friction. In this position in which the centrifugal seal 29 has lifted away from the mating surface 28, the flow rate of the oil mist flow flowing through the labyrinth seal from the oil chamber 27 is also very small on account of the multiple diversions of the oil mist flow in the labyrinth seal and on account of the very small gap between the sealing lip of the centrifugal seal and the mating surface 28; given the achieved advantage, said flow rate can be tolerated. Furthermore, as a result of the radially outward movement of the centrifugal seal 29, the oil mist flow is conveyed back towards the oil chamber 27 as a result of a generated pressure gradient; thus, the above-described drawback can even be offset.

In addition to the dimensioning and arrangement of the weak point 32 and the shape and arrangement of the centrifugal seal 29, additional design parameters for the centrifugal seal 29 include the mass of the part of the centrifugal seal 29 on which the sealing lip is arranged, the material of the centrifugal seal 29 and the deformation properties thereof, and the speed of the shaft 11.

Furthermore, to configure the sealing properties of the labyrinth seal and the centrifugal seal 29 provided therein, it is also possible to exploit the geometry of the throughflow channels in both the static state and the dynamic state, i.e. when the centrifugal seal 29 moves.

In this respect, in particular the first and second reinforcement bodies 14 and 23, which can be considered to be dimensionally stable support bodies, and the supporting body 26 are particularly advantageous because said reinforcement bodies and said supporting body allow the geometry of the throughflow channels in the labyrinth seal to be maintained. Furthermore, the dynamic centrifugal seal 29 is particularly important because said seal forms a contact seal with respect to the mating surface 28 on the first reinforcement element 14 when the shaft 11 is at a standstill; ideally, said centrifugal seal completely separates the oil chamber 27 and the atmosphere-side exterior 25 in the case of a circumferential sealing lip. It is advantageous here for the mating surface 28 to be provided on the dimensionally stable first reinforcement element 14, i.e. on a dimensionally stable support body which is fixed with respect to the housing and forms a dimensionally precise sealing surface on account of the dimensional stability thereof, even when subject to the acting forces. Furthermore, the use of the dimensionally stable support bodies to form the dimensionally precise labyrinth seal, in particular when the proposed dynamic centrifugal seal 29 is used, is advantageous because said centrifugal seal can thus perform the required movements in the labyrinth, which is dimensionally precise even when the shaft 11 is rotating. In particular, it is thus possible to ensure that the sealing lip of the centrifugal seal 29 deliberately lifts away and loses contact with the mating surface 28, without coming uncontrollably to rest again against another wall of the labyrinth, as a result of which the friction would disadvantageously increase again. If desired, however, the centrifugal seal 29 may also alternatively be designed such that said seal comes to rest again against a further mating surface above a certain speed, and deliberately reseals the throughflow channel in the labyrinth.

Figure 2:
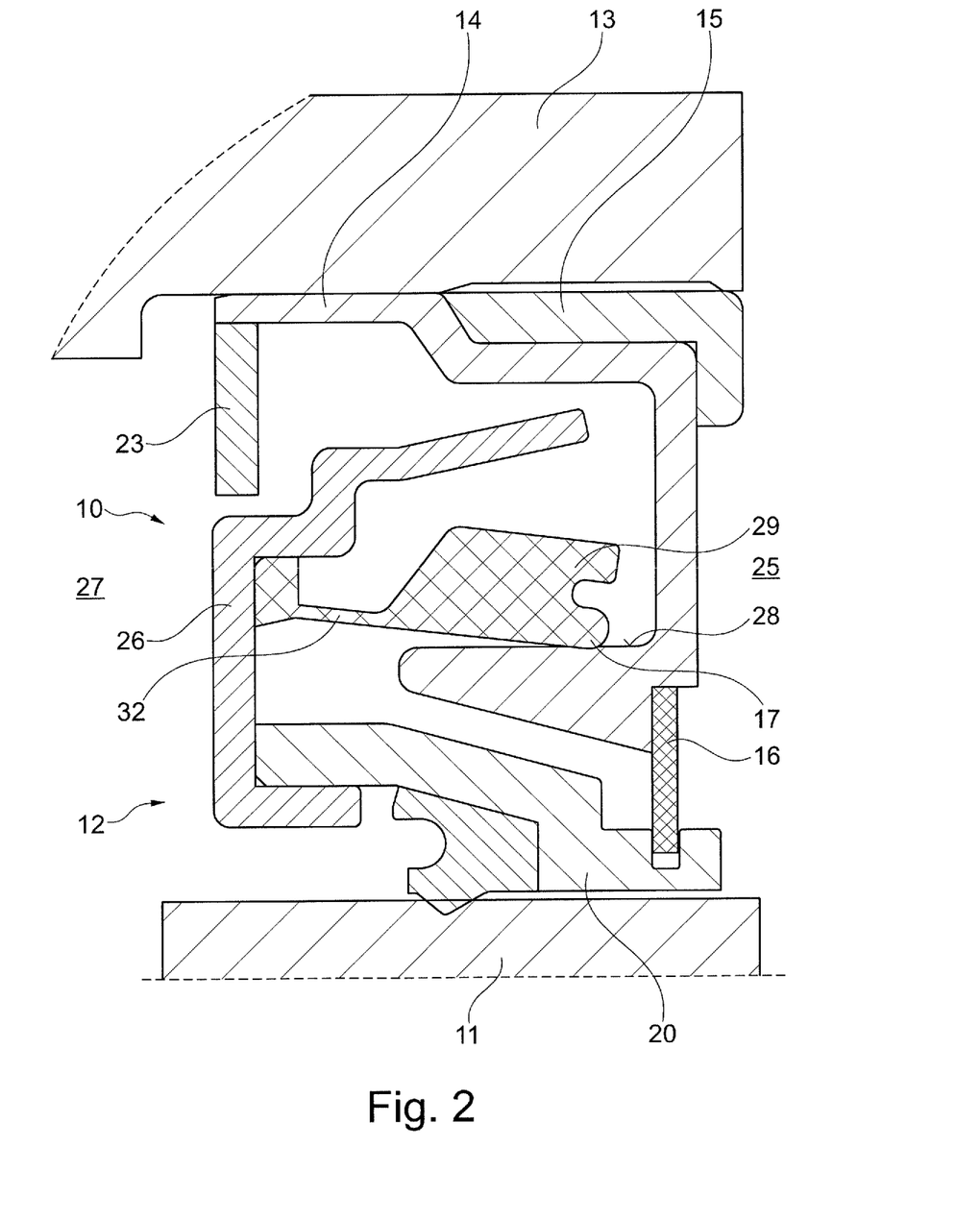
FIG. 2 is a cross section through a shaft seal according to the invention, according to a second embodiment, the contact seal being closed.
Figure 3:
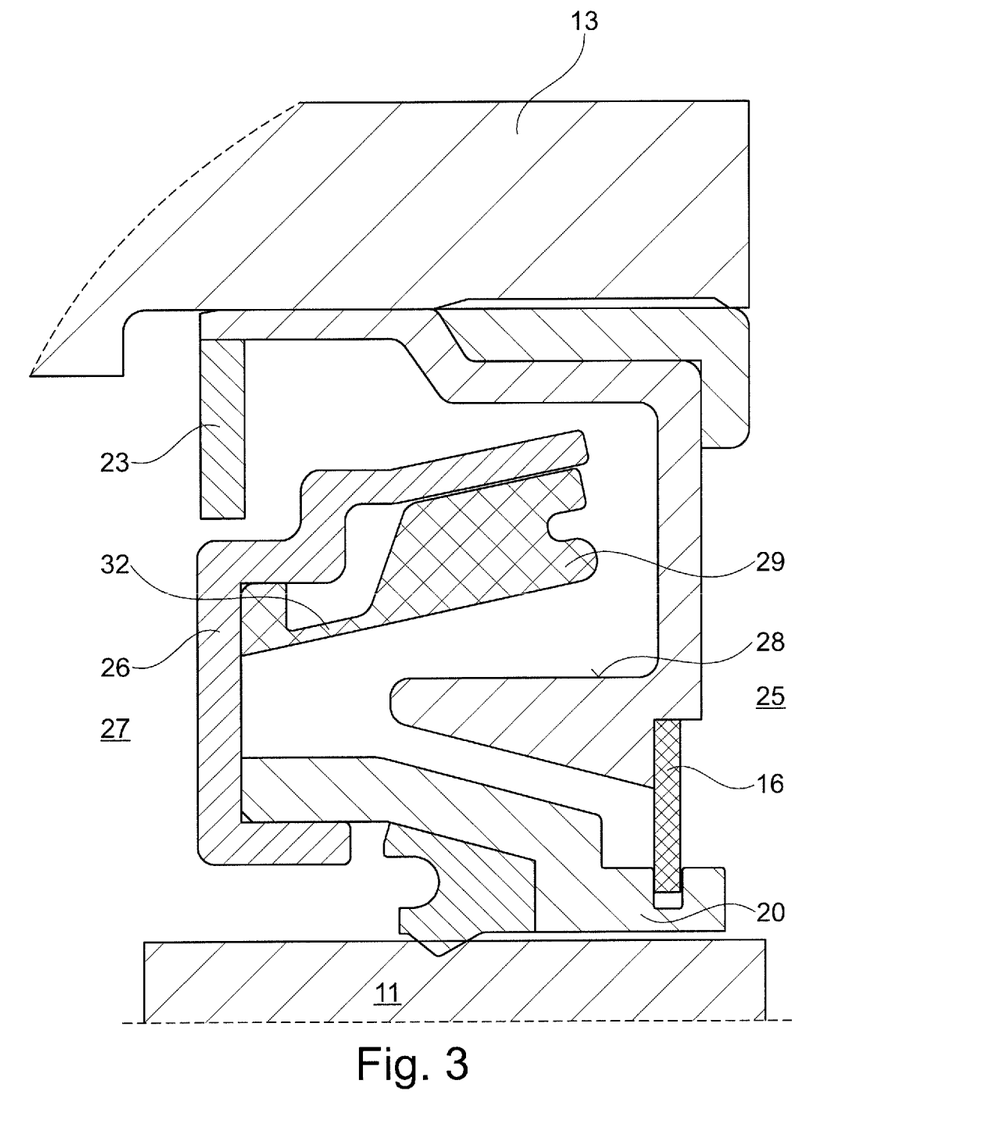
FIG. 3 is a cross section through a shaft seal according to the invention, according to a second embodiment, the contact seal being open.

FIGS. 2 and 3 show a shaft seal 10 according to the invention, according to a second embodiment; specifically, the centrifugal seal 29 is closed in FIG. 2, and the centrifugal seal 29 is open in FIG. 3. The second embodiment of the shaft seal 10 is characterised by a smaller number of individual parts, thereby reducing manufacturing and assembly costs.

In this case, the supporting body 26 is connected to the shaft 11 by a single reinforcement plate 20. In addition, the second reinforcement body 23 is formed as a ring, the inner diameter of which extends as far as a shoulder of the supporting body 26. The shaft sealing ring 16 is secured to the first reinforcement body 14; to secure said ring, a clamping ring 15 (not shown) may again be provided in a manner similar to the first embodiment. The radially internal edge of the shaft sealing ring 16 protrudes into a groove in the reinforcement plate 20 that is rotationally fixedly secured to the shaft 11, and thereby seals the gap between the reinforcement plate 20 of the shaft seal 10 and the first reinforcement body 14 of the shaft seal 10.

The centrifugal seal 29 acts identically as in the first embodiment, and in FIG. 2 the sealing surface thereof is sealingly resting against the mating surface 28 of the first reinforcement body 14 while the shaft 11 is not rotating. In the position in FIG. 3, the shaft 11 is rotating at its operating speed, and the sealing surface of the centrifugal seal 29 is pivoted radially outwardly, i.e. open.

In principle, in both embodiments, the centrifugal seal 29 is designed such that when the shaft 11 is not rotating, the sealing surface of said seal rests against the mating surface 28 and blocks the flow of the oil mist through the labyrinth seal. The centrifugal seal 29 is designed such that when pressure is applied to the oil chamber 27, the sealing surface thereof is pressed against the mating surface 28 and the sealing force is increased. The sealing action of the shaft seal 10 is thus increased when pressure is applied to the oil chamber 27, and the shaft seal 10 does not open under any circumstances, even when the pressure in the oil chamber 27 increases.

If the shaft 11 is rotating at its operating speed, the sealing surface of the centrifugal seal 29 lifts away from the mating surface 28, as can be seen in FIG. 3. The operating speed is defined by the operating range of the unit in which the shaft 11 rotates. This may be a very wide range or a very precisely defined speed range, depending on the type of unit. Above all, it is important for the sealing lip of the centrifugal seal 29 to sealingly rest against the mating surface 28 when the shaft 11 is at a standstill, while said sealing lip lifts away at the operating speed and thereby reduces friction.

Figure 4:
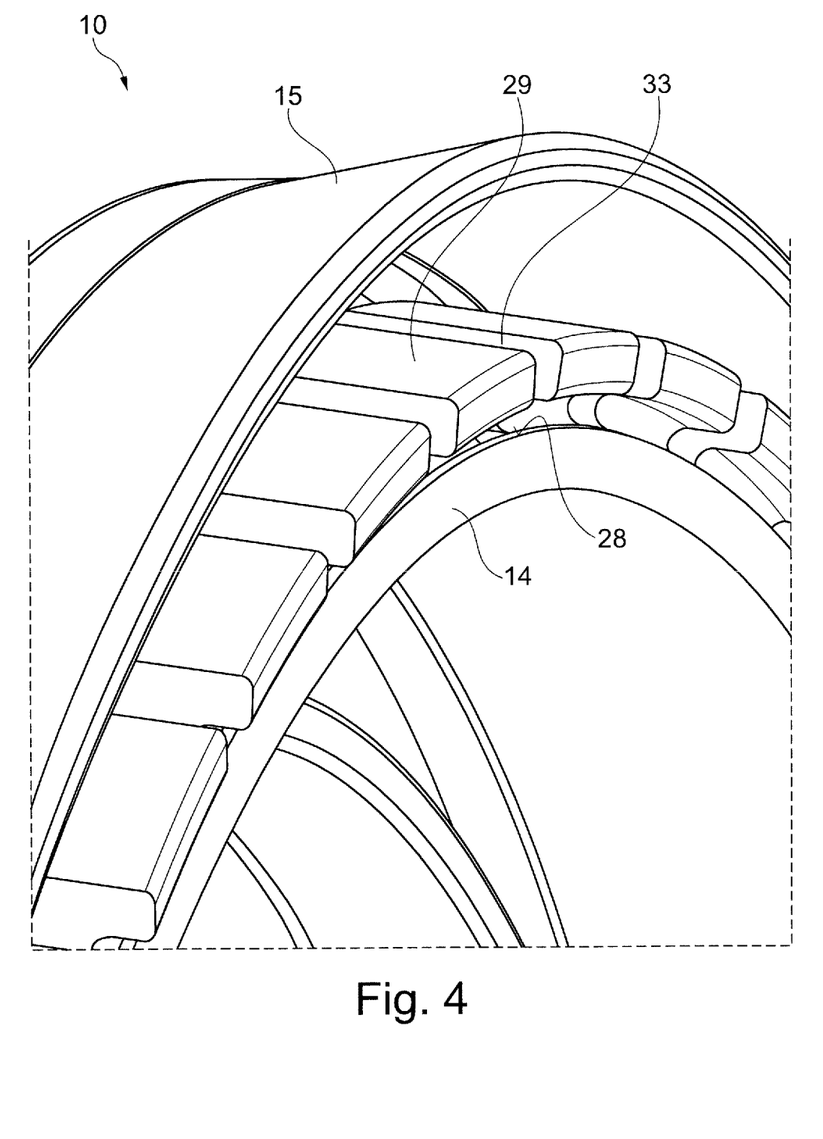
FIG. 4 is an oblique view of the shaft seal, together with the contact seal and the first reinforcement body.

FIG. 4 shows the shaft seal 10 from FIGS. 2 and 3 with a cut-out of the first reinforcement body 14 and with a view of the centrifugal seal 29, i.e. from the atmosphere side 25. In this case, the centrifugal seal 29 is formed by a plurality of individual segments that are separated from one another by spaces 33, are more mobile on account of the spaces 33 and can also individually lift away from the mating surface 28. Furthermore, although a small amount of oil mist may pass through the spaces 33, the amount of oil is still reduced because the spaces 33 in the centrifugal seal 29 also form channels of the labyrinth seal and increase the resistance to the throughflow of the oil mist in comparison with the solutions known in the prior art.

Figure 5:
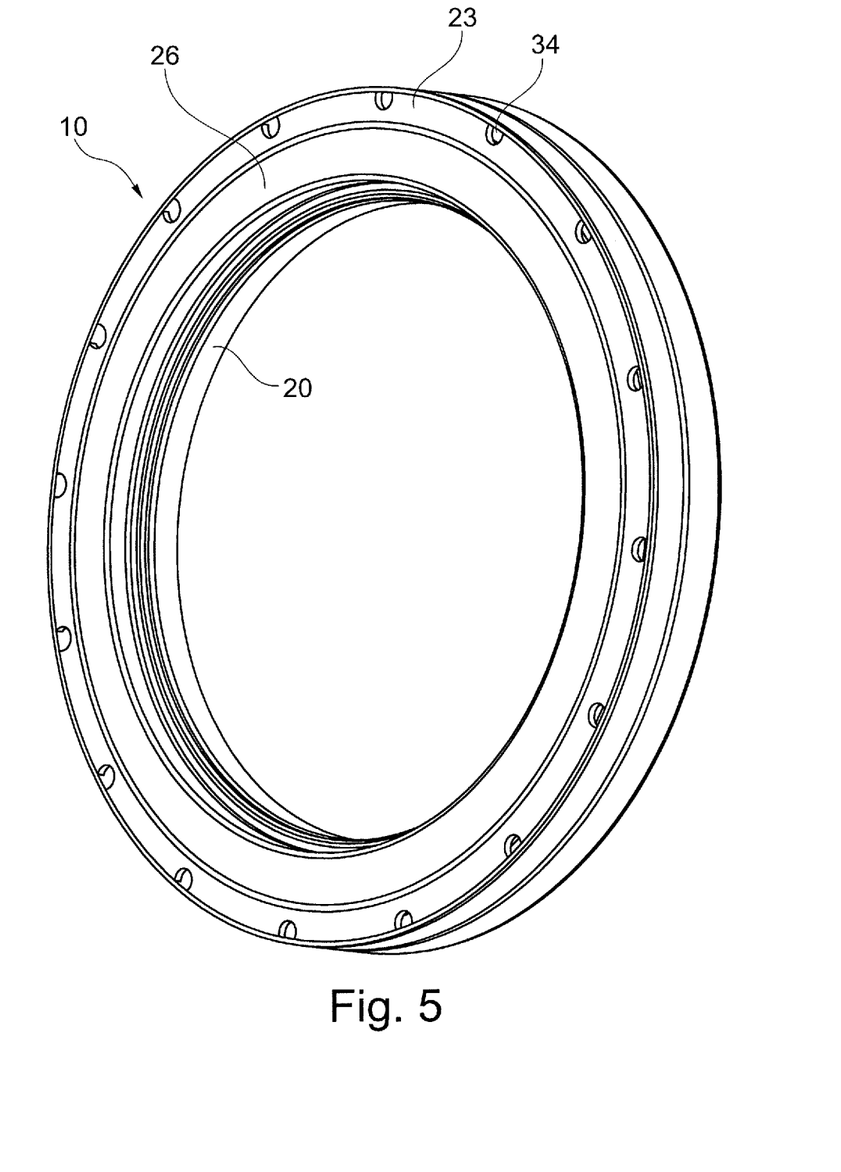
FIG. 5 shows the oil side of the shaft seal according to the invention.

FIG. 5 shows the shaft seal 10 from FIGS. 2 and 3, as viewed from the oil chamber 27 side, i.e. with a view of the supporting body 26. A plurality of uniformly arranged through-openings 34 are provided in the second reinforcement body 23 fixed with respect to the housing; the oil mist from the labyrinth seal can pass back into the oil chamber 27 via said through-openings.

EMBODIMENTS

Embodiment 1

Shaft seal (10) for sealing a shaft (11) against a housing (13) of a motor vehicle, comprising a shaft sealing ring (16) having a sealing lip for sealing the shaft (11) against the housing (13), characterised in that a labyrinth seal is arranged upstream of the shaft sealing ring (16) on the oil side thereof.

Embodiment 2

Shaft seal (10) according to embodiment 1, characterised in that the labyrinth seal comprises two axially interlocking support bodies.

Embodiment 3

Shaft seal (10) according to embodiment 2, characterised in that one or both support bodies are angled in portions.

Embodiment 4

Shaft seal (10) according to either embodiment 2 or embodiment 3, characterised in that one of the support bodies is intended to be fixed with respect to the shaft, and one of the support bodies is intended to be fixed with respect to the housing, such that the two support bodies rotate relative to one another when the shaft is rotating.

Embodiment 5

Shaft seal (10) according to any of the preceding embodiments, characterised in that the labyrinth seal comprises, on the oil side thereof, a radially extending reinforcement body (14, 23).

Embodiment 6

Shaft seal (10) according to any of the preceding embodiments, characterised in that the labyrinth seal comprises a contact seal having a sealing lip (17) and a mating surface (28) that sealingly interacts with the sealing lip (17).

Embodiment 7

Shaft seal (10) according to embodiment 6, characterised in that the contact seal is intended to be fixed with respect to the shaft, and the mating surface (28) is fixed with respect to the housing.

Embodiment 8

Shaft seal (10) according to either embodiment 6 or embodiment 7, characterised in that the contact seal is designed and arranged to lift away from the mating surface (28) when the shaft is rotating during proper operation.

Embodiment 9

Shaft seal (10) according to embodiment 8, characterised in that the contact seal has a weak point (32) which, on account of the dimensioning and arrangement thereof, facilitates the lifting away of the contact seal.

Embodiment 10

Shaft seal (10) according to any of embodiments 6 to 9, characterised in that the contact seal is formed of an elastomer material.

Embodiment 11

Shaft seal (10) according to any of the preceding embodiments, characterised in that the shaft sealing ring (16) consists of a PTFE-containing material at least in the region of the sealing lip thereof.

The invention claimed is:
1. A shaft seal for sealing a shaft against a housing of a motor vehicle, comprising:
   a shaft sealing ring having a sealing lip for sealing the shaft against the housing, wherein a labyrinth seal is arranged upstream of the shaft sealing ring on an oil side of the shaft sealing ring, wherein the labyrinth seal comprises:
- a contact seal having a sealing lip; and
- a mating surface that sealingly interacts with the sealing lip, wherein the contact seal is designed and arranged to lift away from the mating surface when the shaft is rotating during proper operation, and wherein the contact seal has a weak point which, on account of the dimensioning and arrangement of the weak point, facilitates the lifting away of the contact seal from the mating surface when the shaft is rotating during proper operation.

2. The shaft seal according to claim 1,
wherein the labyrinth seal comprises two axially interlocking support bodies.

3. The shaft seal according to claim 2,
wherein one or both of the two axially interlocking support bodies are angled in portions.

4. The shaft seal according to claim 2,
wherein a first of the two axially interlocking support bodies is configured to be fixed with respect to the shaft, and a second of the two axially interlocking support bodies is configured to be fixed with respect to the housing, such that the two axially interlocking support bodies rotate relative to one another when the shaft is rotating.

5. The shaft seal according to claim 1,
wherein the labyrinth seal comprises, on an oil side of the labyrinth seal, a radially extending reinforcement body.

6. The shaft seal according to claim 1,
wherein the contact seal is formed of an elastomer material.

7. The shaft seal according to claim 1,
wherein the shaft sealing ring consists of a PTFE-containing material at least in the region of the sealing lip thereof.

8. The shaft seal according to claim 1,
wherein the contact seal is formed of an elastomer material.

9. The shaft seal according to claim 8,
wherein the shaft sealing ring consists of a PTFE-containing material at least in the region of the sealing lip thereof.

* * * * *